Patented May 19, 1931

1,805,593

UNITED STATES PATENT OFFICE

AAGE WILLAND OWE, OF OSLO, NORWAY

PROCESS OF PRODUCING VITAMINE PREPARATIONS

No Drawing.     Application filed July 8, 1926. Serial No. 121,269.

This invention relates to the manufacture of vitamine preparations from animal oils or fats rich in fat soluble vitamines by saponifying the fat and afterwards extracting the vitamine from the resulting soap.

It is known in the production of concentrated vitamine preparations to make use of volatile, organic solvents such as alcohol, ether, benzol and the like as lixiviation agents. In the form in which the vitamines are present, directly after the lixiviation operation, that is, dissolved in the lixiviation agent, the vitamines are not suited as constituents of food and medicine. The lixiviation agent must first be removed by evaporation and the vitamines absorbed or dissolved in liquid or solid alimentary substances. Further these known processes are laborious and involve a considerable risk of vitamine losses during the evaporation of the solvent. It is to be noted also, that lixiviation agents of the character herein referred to, besides vitamines dissolve also considerable quantities of other substances which necessitate comprehensive purification treatment of the resulting preparation.

The last-named drawback is involved also in other known methods, for example in a recently suggested method of vitaminizing fats which consists in extracting vitamines from an aqueous soap solution by means of an edible fat. As a consequence of the fact, that the soaps in this known process are present in aqueous solution, the extraction operation results in the formation of a persistent emulsion, which renders it difficult to bring about separation of the fatty extract in considerable quantities and in a sufficiently soap-free condition.

The present invention has for its object a process of vitaminizing fats whereby the difficulties above referred to are avoided.

In this process an edible fat is made use of to extract the vitamines from a saponified marine oil or fat rich in vitamines but as compared with the known method above referred to the present process is characterized therein that lixiviation with edible oil takes place in a substantially non-dissociating medium. When the operation is carried into effect under such conditions it is possible after the extraction to obtain the vitamine solution separated in a completely clear condition so that it, at most after a quite simple purifying treatment, can be used directly as a constituent of alimentary substances or medicine. An embodiment of the invention is described by way of example in the following:

100 kilograms of fish liver oil and 360 litres of alcoholic potash lye (containing 5% KOH) are introduced into a closed vessel provided with an agitator. The charge is stirred until a clear solution results. The agitator is then stopped and the solution is left standing without supply of heat until a test shows that the saponification is complete. 200 kilograms of sun flower oil is then introduced, whereupon the agitator is started and kept operating for about 15 minutes. On standing the resulting emulsion will rapidly separate into two quite clear layers, at the bottom the extracted soap solution and at the top the sun flower oil, which now contains the main part of the vitamines which were originally present in the fish liver oil. The sun flower oil contains in solution besides the vitamines also a small quantity of alcohol. Unless the oil is to be used in medicines containing alcohol it will be of advantage to remove the alcohol for example by distillation in vacuum or by passing steam through the oil. The last-named method will usually be of advantage also as regards the flavour of the preparation. If required the oil is then passed through a filter, a centrifugal separator or the like, and is then ready for use.

As compared with the known method of lixiviating an aqueous soap solution with an edible oil the method described in the above example involves an additional advantage of considerable importance, which is due to the fact that the saponification by means of caustic potash dissolved in alcohol can be effected at a very much lower temperature than the saponification by means of potash dissolved in water. In the first-named case the heat evolved by the addition of the lye is sufficient while in the other instance boiling is usually necessary. This high temperature treatment, however, involves a great risk of vitamine destruction. In the described example it will do no harm if the alcoholic lye contains some water, but the percentage of water must not exceed the limit at which hydrolization of the soap sets in.

It will be understood that the present invention is not limited to the specific process described in the above example, and it will be obvious to everybody skilled in the art, that the required condition; a non-dissociating medium for the extraction with edible fat can be established by means other than those given in the example. Thus the soap may be subjected to lixiviation in a dessicated condition or the alkali employed to effect saponification can be dissolved in other solvents than ethyl alcohol (for example glycerine) or the dissociation in an aqueous soap solution can be diminished or eliminated by suitable additions such as for example methyl alcohol.

Claims.

1. Process of producing vitamine preparations comprising in combination the steps of saponifying fat rich in vitamines with a solution of caustic alkali in a substantially non-dissociating liquid so as to obtain a solution of substantially non-dissociated alkali metal soaps, incorporating a proportion of an edible fat into the resulting solution of non-dissociated soaps so as to dissolve the vitamines contained therein and separating the vitaminized fat from the solution of non-dissociated soaps.

2. Process of producing vitamine preparations which comprises the steps of mixing an edible oil with an alcoholic solution of alkali metal soaps rich in vitamines, agitating the mixture and separating the resulting vitaminized edible oil from the alcoholic solution of alkali metal soaps.

3. Process of producing vitamine preparations which comprises the steps of mixing an edible oil with an alcoholic solution of alkali metal soaps rich in vitamines, agitating the mixture and separating the resulting vitaminized edible oil from the alcoholic solution of alkali metal soaps, evaporating the alcohol remaining in the vitaminized edible oil and subjecting the oil to filtration to remove suspended matter therefrom.

In testimony whereof I have signed my name to this specification.

AAGE WILLAND OWE.